United States Patent [19]

Chung

[11] Patent Number: 6,094,317
[45] Date of Patent: Jul. 25, 2000

[54] METHOD FOR CONTROLLING DATA READING/WRITING ON RANDOM DATA SECTION CONTAINING DEFECTIVE SECTOR

[75] Inventor: Yong-Seok Chung, Ahnyang, Rep. of Korea

[73] Assignee: SamSung Electronics Co., Ltd., Suwon, Rep. of Korea

[21] Appl. No.: 08/997,977

[22] Filed: Dec. 24, 1997

[30] Foreign Application Priority Data

Dec. 31, 1996 [KR] Rep. of Korea .................. 96-82657

[51] Int. Cl.⁷ .................................................. G11B 5/09
[52] U.S. Cl. .................................................. 360/53; 360/47
[58] Field of Search ............................... 360/53, 47, 31, 360/48; 714/6, 7, 42, 770, 747, 701

[56] References Cited

U.S. PATENT DOCUMENTS 5,844,911  12/1998  Schadegg ............................. 714/710

*Primary Examiner*—Alan T. Faber
*Attorney, Agent, or Firm*—Robert E. Bushnell, Esq.

[57] ABSTRACT

A method for controlling a data read/write operation of a disk drive recording device provided with re-allocated reserve sectors as a substitute for defective sectors, includes the steps of: reading data written on the reserve sectors when turning the power on and further storing the data, and disposing the data stored after being retrieved from the re-allocated reserve sectors as a substitute for defective sectors to the rear of data retrieved from a sector preceding the defective sector when accessing a random data section containing the defective sector, and further transferring the resulting data.

7 Claims, 4 Drawing Sheets

METHOD FOR CONTROLLING DATA READING/WRITING ON RANDOM DATA SECTION CONTAINING DEFECTIVE SECTOR

CLAIM OF PRIORITY

This application makes reference to, incorporates the same herein, and claims all benefits accruing under 35 U.S.C. §119 from an application for METHOD FOR CONTROLLING DATA READING/WRITING ONRANDOMDATA SECTION CONTAINING DEFECTIVE SECTOR earlier filed in the Korean Industrial Property Office on Dec. 31, 1996 and there duly assigned Serial No. 82657/1996.

BACKGROUND OF THE INVENTION

1. Field of the Invention

The present invention relates to a method for controlling defective sectors of disk drive recording devices, and more particularly a method for controlling a data reading/writing operation on random data sections containing defective sectors.

2. Description of the Related Art

Disk drive recording devices, such as a hard disk drive and a floppy disk drive, are widely used as auxiliary storage devices for computer systems. Especially, the hard disk drive not only has a capacity to stably store a large amount of data, but also makes it possible to access stored data at a great speed, and accordingly has been rapidly popularized. Recently, since multimedia devices have rapidly spread, the audio/video disk drives must maintain a data transfer rate at least above a specified speed. One of the methods for meeting the above requirement is to control the defective sectors on the disks. The earlier widely used method for controlling the defective sectors on disk drive recording devices is explained below for a hard disk drive.

Generally, there are two methods for controlling defective sectors of hard disk drives. The one method is the sector slipping method in which, when a defect is detected in one of the consecutive data sectors (hereinafter referred to as a "sector"), the following sector next to the defective sector is used as the consecutive sector next to the preceding valid sector by setting aside the defective sector (see FIG. 1A). Another method is the re-allocation of a reserved sector substituting for the defective sector in which, when a defective sector is detected on one of the tracks of disks, a reserve sector on one of the tracks is re-allocated to substitute for the defective sector. The number of reserve sectors on any optional track is determined according to the designer's intention, and the entire span of a specified track can be set aside as a reserve sector track (see FIGS. 1B and 1C).

The second defective sector control method has a drawback in that the data read time is delayed. To explain in detail, when reading a data section containing a defective sector, at first the read/write head reads the sectors preceding the defective sector, and then moves to the reserve sector re-allocated as a substitute for the defective sector to read data, and finally reads again the following sectors next to the defective sector, which results in requiring unnecessary additional track seek time. In other words, when reading data written on a data section containing defective sector(s), it is a problem in that the additional time (track seeking time+object sector following time) is required unnecessarily. As a result, the disk drives at first satisfy the audio/video drive condition at the time of delivery, but are gradually deprived of the satisfaction of the above condition due to the defective sectors formed with the passage of time.

Each of the following patents disclose features in common with the present invention but do not teach or suggest a method for controlling data reading/writing on a random data section containing a defective sector as in the present invention: U.S. Pat. No. 5,271,018 to Chan, entitled Method And Apparatus For Media Defect Management And Media Addressing, U.S. Pat. No. 5,339,319 to Yamane et al., entitled Rotary Type Storage Apparatus And Control Method Thereof, U.S. Pat. No. 5,442,193 to Shih et al., entitled Data Recording System Having Improved Bookkeeping Capability, U.S. Pat. No. 5,357,381 to Yasuda et al., entitled Flexible Magnetic Disc Drive Apparatus For Designating Alternate Sectors For Defective Sectors, U.S. Pat. No. 5,258,852 to Kamijima, entitled Recording Medium And Video Signal Recording/Reproducing Method Using A Predetermined Area Of A Recording Medium To Record Information Intended To Be Recorded In A Defective Portion Of The Medium, U.S. Pat. No. 5,166,936 to Ewert et al., entitled Automatic Hard Disk Bad Sector Remapping, U.S. Pat. No. 5,202,876 to Takagi et al., entitled Optical Disc Recording-Reproducing Apparatus In Which Sector Substitution Of Defective Sectors Is Performed, U.S. Pat. No. 5,666,335 to Horibe, entitled Apparatus And Method For Correcting For Defective Sectors In A Recording Medium, U.S. Pat. No. 4,986,668 to Fukushima et al, entitled Information Recording And Reproducing Apparatus With Management Of Defective Sector, U.S. Pat. No. 4,405,952 to Slakmon, entitled Apparatus For Detecting Faulty Sectors And For Allocating Replacement Sectors In A Magnetic Disk Memory, U.S. Pat. No. 5,241,531 to Ohno et al., entitled Storage Medium Having Read/Write Storage Region And Read-Only Storage Region And A Method For Managing Defective Sectors In The Storage Medium, and U.S. Pat. No. 5,111,444 to Fukushima et al, entitled Method Of Managing Defective Sectors In A Disk-Shaped Information Recording Medium And AN Apparatus For Performing The Same.

SUMMARY OF THE INVENTION

Accordingly, it is an object of the present invention to provide a data read/write control method capable of preventing the data access time from being delayed due to defective sectors.

In attaining the above object, the data read/write control method of the disk drive recording device having re-allocated reserve sectors as a substitute for defective sectors according to the present invention is characterized in that, when the power is on, the read/write head reads and stores the data written on the reserve sectors, and when accessing a data section containing a defective sector, the R/W head copies the data retrieved from the above re-allocated reserve sector to the rear of the data retrieved from the sector preceding the defective sector without moving the transducer.

The present invention will now be described more specifically with reference to the drawings attached only by way of example, whereby the operation procedure according to the preferred embodiment of the present invention is described by means of many specific details such as the defective sector position, the buffer memory configuration, and the concrete process flow, but the following examples are given only with the purpose to allow those skilled in the art to better understand the present invention but in no way must they be construed as a limitation of the invention itself.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
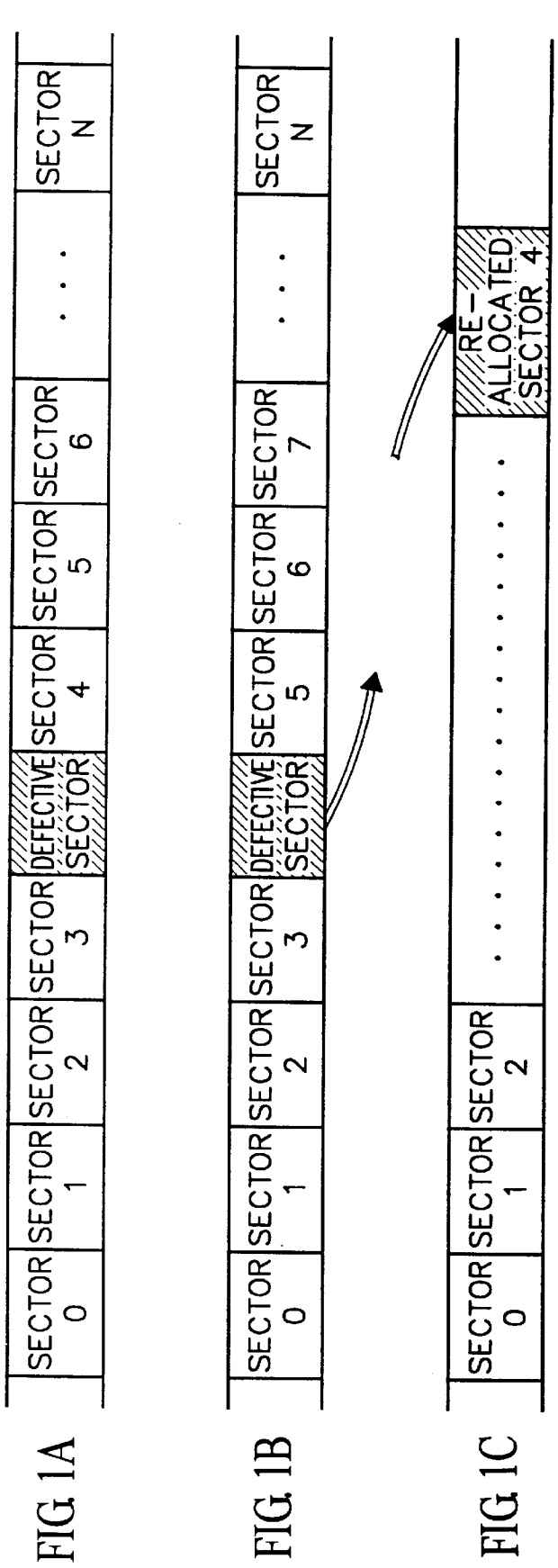
FIGS. 1A–1C are schematic diagrams illustrating the sector format to describe earlier control methods of defective sectors of hard disk drives.
Figure 2:
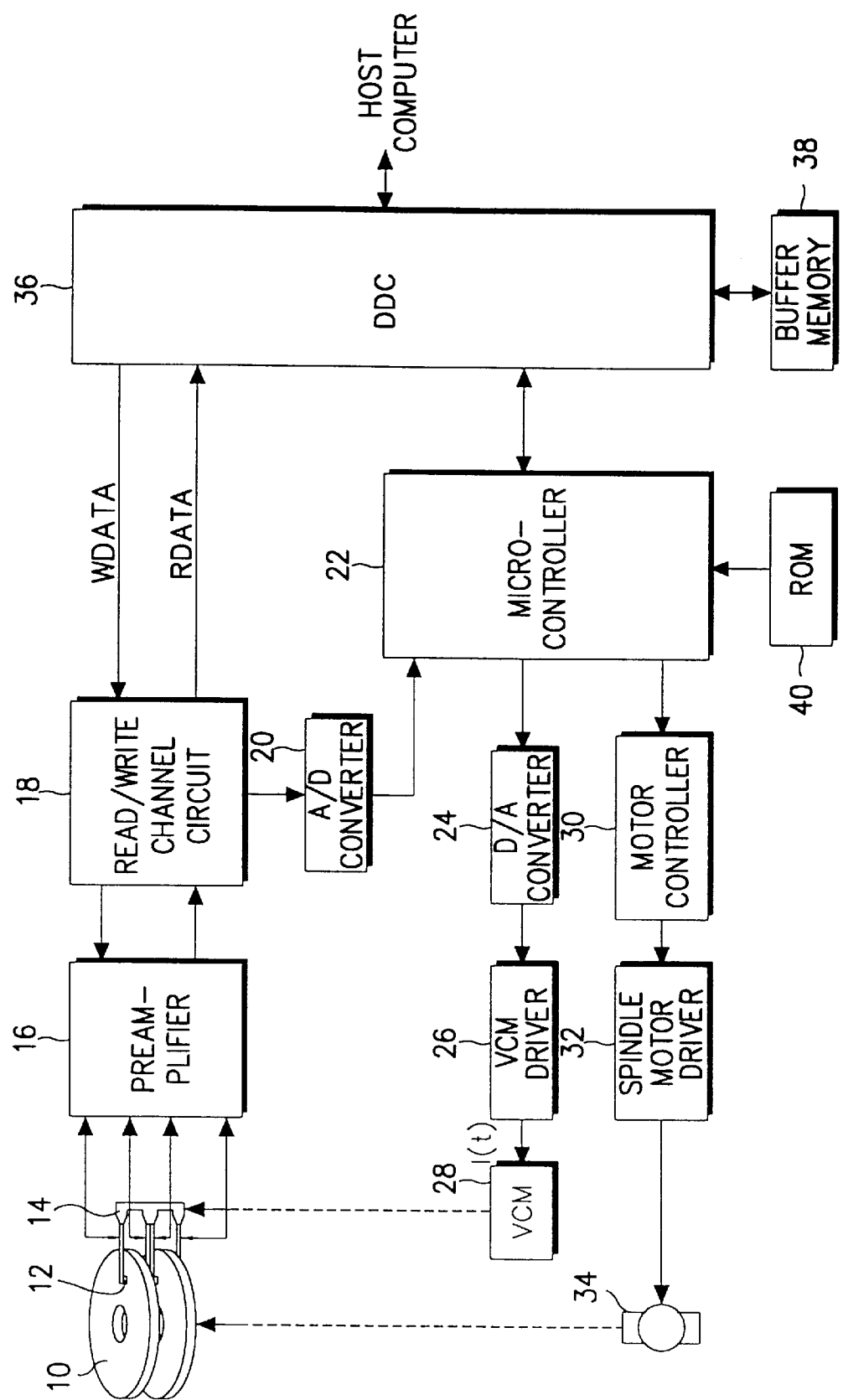
FIG. 2 is a block diagram illustrating a hard disk drive.

FIG. 2 is a block diagram illustrating a hard disk drive comprising two disks and four corresponding heads 12 in which the disks 10 are mounted by stacking them on a drive shaft of a spindle motor 34 so as to be rotated, and each of the disk surfaces has a corresponding head 12. Usually, each of the disk surfaces has a plurality of concentrical tracks arranged thereon and a parking zone for positioning the head 12 thereover during power-off. The heads 12 are each positioned above the respective disk surfaces, and are each mounted on corresponding arms 14 extending perpendicularly from the arm assembly of a rotary voice coil motor (VCM) 28.

When reading data from the disks, the preamplifier 16 amplifies the read signals picked up by one of the heads 12 and supplies the amplified signals to the read/write channel circuit 18, and when writing data onto the disks, the preamplifier 16 activates the corresponding one of the heads 12 to write the encoded write data applied by/from the read/write channel circuit 18 onto the corresponding disk 10, the preamplifier 16 selecting one of the heads 12 under the control of a disk data controller (DDC) 36.

The read/write channel circuit 18 decodes the read signal supplied by/from the preamplifier 16 to produce the read data RDATA, and encodes the write data WDATA supplied by/from the DDC 36 to supply it to the preamplifier 16. Also the read/write channel circuit 18 demodulates the head positioning information, a part of the servo information, recorded on the disks 10 to produce a position error signal (PES), which is then supplied to an A/D converter 20, and the A/D converter 20 converts the PES into a digital level value corresponding to the PES level so as to further supply it to the microcontroller 22.

The DDC 36 writes the data received from the host computer on the disks 10 through the read/write channel circuit 18 and the preamplifier 16, and transmits the data retrieved from the disks 10 to the host computer. Also the DDC 36 interfaces communications between the host computer and the microcontroller 22.

Furthermore, the microcontroller 22 controls the DDC 36 in response to the read/write instructions received from the host computer and further controls the track seeking and following operations. The microcontroller 22 controls the track following operations by means of the PES value supplied by the A/D converter 20, and performs servo control in response to the various servo related signals produced by a gate array (not shown). A D/A converter 24 converts a control signal produced by the microcontroller 22 into an analog signal for controlling the positions of the heads 12.

A voice coil motor driver 26 generates an actuator driving current I(t) in response to the signal supplied by the D/A converter 24 and supplies it to the VCM 28 in order to drive the actuator. The VCM 28 moves the heads 12 horizontally above the disks 10 in response to the current level and direction received from the VCM driver 26.

A motor controller 30 controls the spindle motor driver 32 according to the control value generated by the microcontroller 22 for controlling the rotation of the disks 10. The spindle motor driver 32 activates the spindle motor 34, and thus rotates the disks 10 under the control of the motor controller 30.

A buffer memory 38 connected to the disk data controller (DDC) 36 temporarily stores data exchanged between the host computer and the disks 10 under the control of the disk data controller (DDC) 36, and the data retrieved from the reserve sector corresponding to the defective sector at the time of initialization.

A ROM 40 connected to the microcontroller 22 stores the control program according to an embodiment of the present invention.

Figure 3:
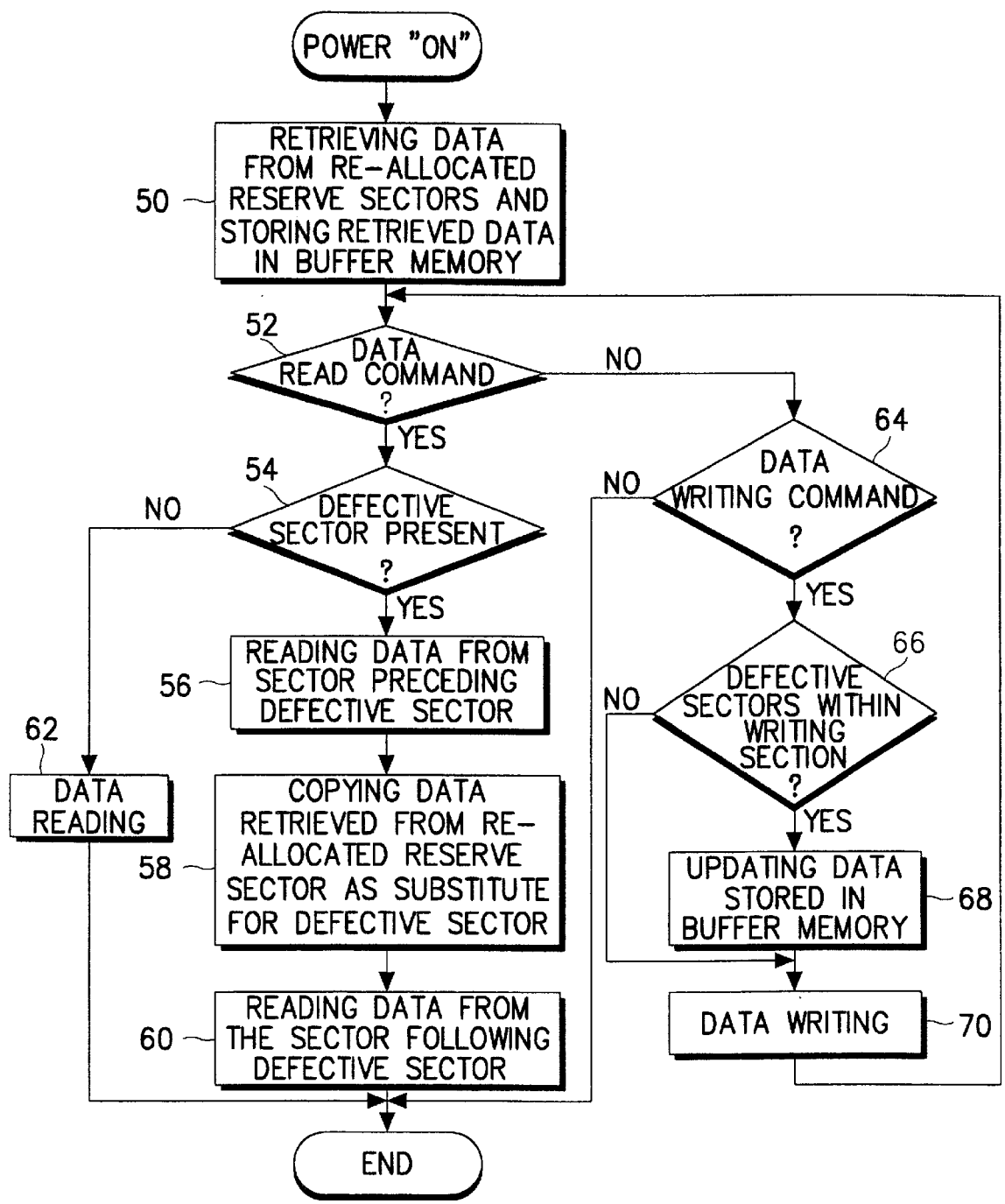
FIG. 3 is a flowchart illustrating the procedure of the data read/write control executed by a microcontroller according to an embodiment of the present invention.

To explain the data read/write control procedure according to an embodiment of the present invention with reference to FIGS. 2–4, when turning the power on, in step 50 as a part of the initialization program, the microcontroller 22 retrieves the data written on the re-allocated reserve sector on the disk 10 and stores them in the buffer memory 38. Thereafter, when receiving the data reading command from the host computer in step 52, the microcontroller 22 proceeds to step 54 to check whether the defective sector is present in the data section to be read. As a result, when a defective sector is not present, the microcontroller 22 proceeds to step 62 to read out the data written on the corresponding data section, thereafter terminating the data reading process.

Figure 4A:
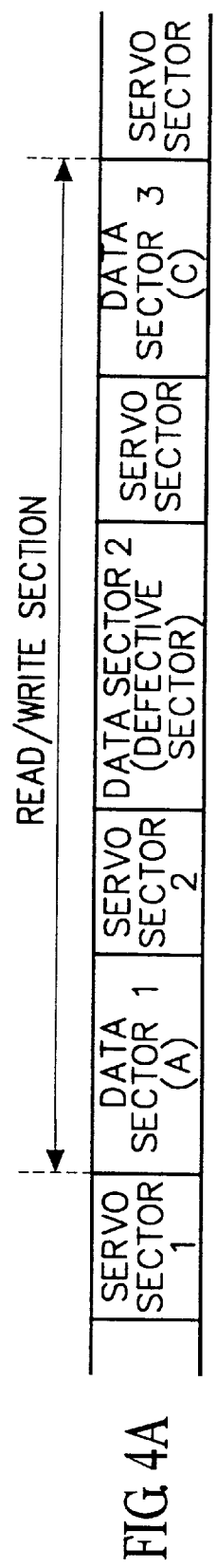
FIGS. 4A–4B are descriptive diagrams illustrating the data arrangement in a buffer memory when reading the data section containing a defective sector according to an embodiment of the present invention.
Figure 4B:
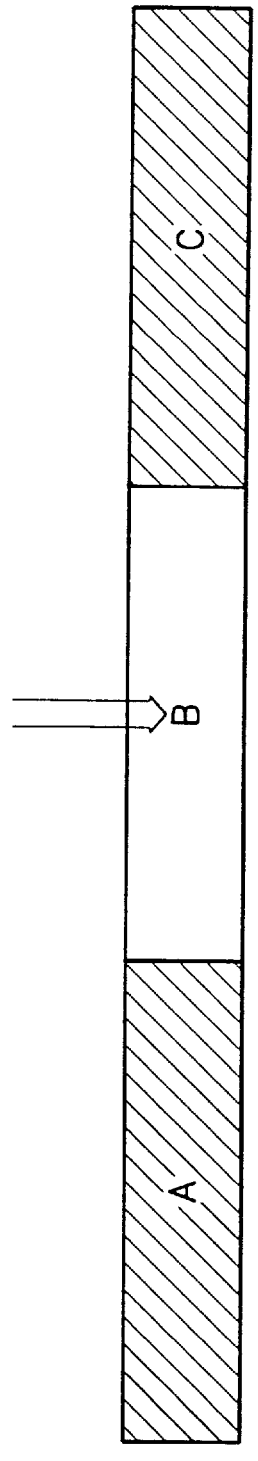

On the contrary, when a defective sector is present in the data section to be read as determined by the checking process in step 54, the microcontroller 22 proceeds to step 56 to read data from the sectors preceding the defective sector. To explain it with reference to FIGS. 4A–4B, assuming that the specific track on the disk 10 has the sector format as shown in FIG. 4A, and the host computer instructs the microcontroller 22 to read the data from sector 1 to sector 3, the microcontroller 22 first reads the sector 1 and stops the data reading just before the sector 2. Thereafter, in step 58, the microcontroller 22 copies the data which has been retrieved from the re-allocated reserve sector corresponding to the data sector 2 (i.e., the defective sector) and stored in the buffer memory 38, and places the data to the rear of the data retrieved from the data sector 1. Then, the microcontroller 22 again continues in step 60 to read the data from the sector next to the defective sector. As a result, the arrangement of the data which is retrieved from the data section of the track having the sector format as shown in FIG. 4A and stored in the buffer memory 38 is the same arrangement as that shown in FIG. 4B. In FIG. 4B, A, B C represent the data written on sector 1, the re-allocated reserve sector corresponding to the sector 2 (defective sector), and sector 3, respectively.

When receiving the data writing command from the host computer in step 64, the microcontroller 22 proceeds to step 66 to check whether a defective sector is present within the data write section. As a result, if a defective sector exists within the write section as shown in FIG. 4A, the microcontroller 22 updates, in step 68, the data stored in the buffer memory 38 which has been retrieved from the re-allocated reserve sector corresponding to the defective sector, further being stored in the buffer memory 38, and then proceeds to step 70. The microcontroller 22 then writes the specific data onto the write section in step 70, and again returns to step 52, so as to check whether the data reading/writing command has been received. Accordingly, even when the specific data is written onto the re-allocated reserve sector corresponding to the defective sector, the data stored in the buffer memory 38 is also updated, so that the data read operations such as those in steps 52–60, can be smoothly performed.

As described above, the present invention provides a novel data read/write control method, wherein all the data written on the re-allocated reserve sector is retrieved at the time of initializing the hard disk drive, then being stored in the buffer memory, and thereafter when accessing the defective sector, the concerned data stored in the buffer memory are copied and disposed to the rear of the data retrieved from the sectors preceding the defective sector, which makes it unnecessary to perform the track seeking and following operation for accessing the defective sector. As aforementioned, the present invention has the advantage of preventing the data access time from being delayed due to the defective sector because the desired data can be read and transferred to the host computer without moving the read/write heads to the re-allocated reserve sector corresponding to the defective sector when accessing the defective sector.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for controlling a data read/write operation of a disk drive recording device provided with re-allocated reserve sectors as a substitute for defective sectors, comprising the steps of:

retrieving data previously stored in said reserve sectors and storing said retrieved data in a buffer memory when turning power on to said disk drive recording device; and, disposing said stored data to the rear of data retrieved from a sector preceding a defective sector when accessing a data section containing a defective sector.

2. A method for controlling a data read/write operation of a disk drive recording device provided with re-allocated reserve sectors as a substitute for defective sectors as defined in claim 1, said data of each of said reserve sectors stored in said buffer memory being updated when writing data in a corresponding defective sector.

3. A method for controlling a data read/write operation of a disk drive recording device provided with re-allocated reserve sectors as a substitute for defective sectors as defined in claim 1, wherein, during a read operation, sectors prior to said defective sector are read, followed in sequence by reading of said data stored in said buffer memory and reading of sectors subsequent to said defective sector.

4. A method for controlling a data read/write operation of a disk drive recording device provided with re-allocated reserve sectors as a substitute for defective sectors as defined in claim 1, wherein, during a write operation, the method comprises the steps of determining whether there are defective sectors in a section into which data is to be written and, when there are defective sectors in the section into which data is to be written, updating the data stored in the buffer memory and writing the data to be written into the section and into the re-allocated reserve sector.

5. A method for controlling a data read operation of a disk drive recording device provided with re-allocated reserve sectors into which data to be written previously to defective sectors was stored, said method comprising the steps of:

retrieving data from said re-allocated reserve sectors and storing said retrieved data in a buffer memory when initializing the disk drive recording device;

when a read command is received reading data from sectors preceding a defective sector;

reading data stored in said buffer memory and placing said data read from said buffer memory to the rear of data retrieved from the sectors preceding the defective sector; and reading data from sectors following said defective sector.

6. A method for controlling a data write operation of a disk drive recording device provided with re-allocated reserve sectors provided for the storage of data and as a substitute for defective sectors, said method comprising the steps of:

retrieving data from said re-allocated reserve sectors and storing said retrieved data in a buffer memory when initializing the disk drive recording device;

when a write command is received, determining whether there is a defective sector within a section into which data is to be written;

when it is determined that there is a defective sector within the section into which data is to be written, updating the data stored in said buffer memory, and writing the data to be written into said section into all sectors of said section except for said defective section, and into at least one of said re-allocated reserve sectors.

7. A method for controlling a data write operation of a disk drive recording device provided with re-allocated reserve sectors provided for the storage of data and as a substitute for defective sectors as defined in claim 6, further comprising the step of writing the data to be written to said section in all sectors of said section when it is determined that there is no defective sector within the section into which data is to be written.

* * * * *